M. H. AND J. C. MORTONSON.
DENTAL CASTING MACHINE.
APPLICATION FILED JAN. 27, 1919.
1,331,660.
Patented Feb. 24, 1920.
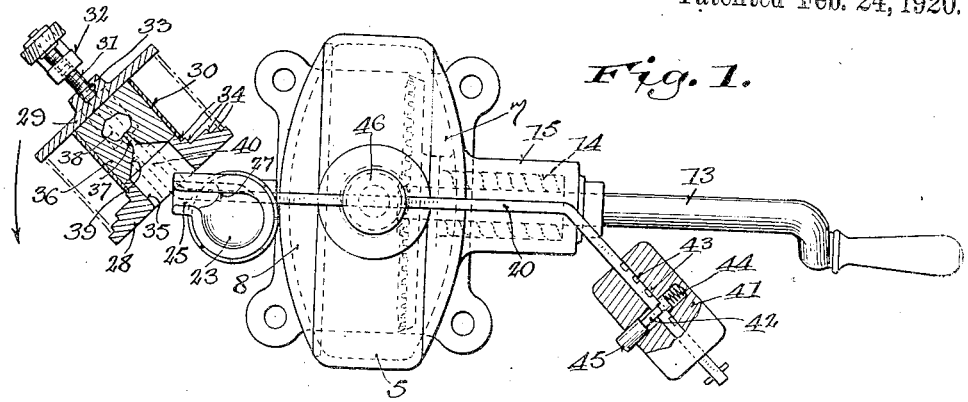
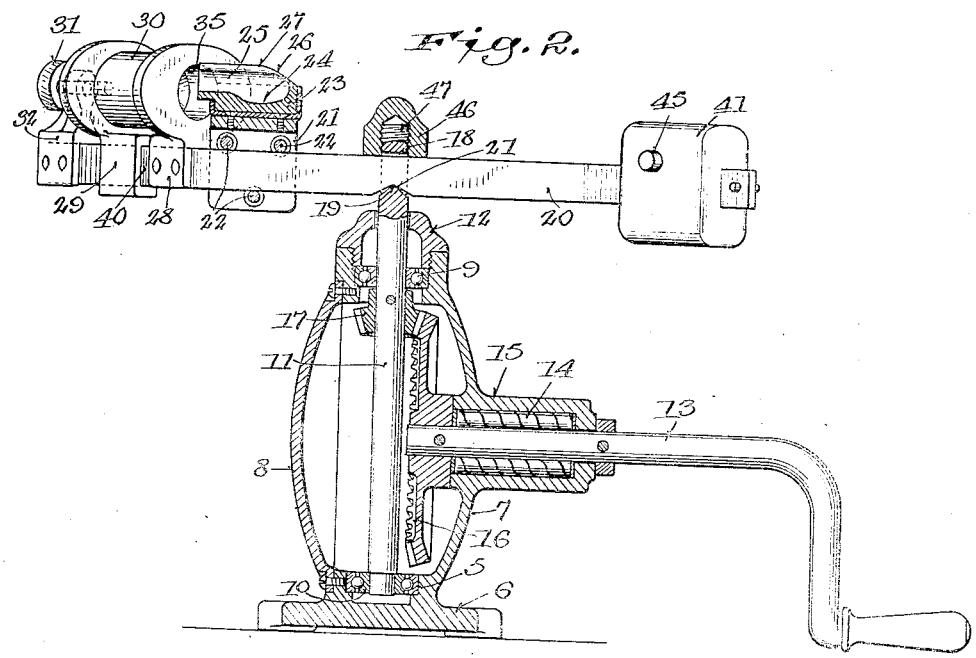
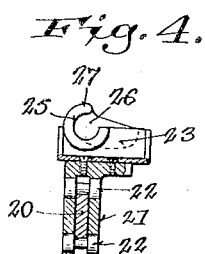 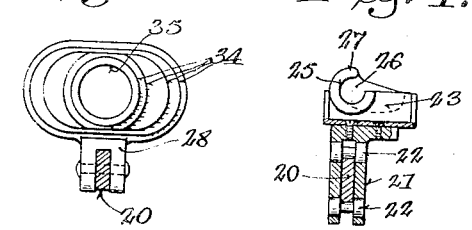
Inventor
Morton H. Mortonson
James C. Mortonson
By Morsell + Keeney
Attorneys.

UNITED STATES PATENT OFFICE.

MORTON H. MORTONSON AND JAMES C. MORTONSON, OF MILWAUKEE, WISCONSIN.

DENTAL CASTING-MACHINE.

1,331,660.   Specification of Letters Patent.   Patented Feb. 24, 1920.

Application filed January 27, 1919. Serial No. 273,353.

*To all whom it may concern:*

Be it known that we, MORTON H. MORTONSON and JAMES C. MORTONSON, citizens of the United States, and residents of Milwaukee, in the county of Milwaukee and State of Wisconsin, have invented new and useful Improvements in Dental Casting-Machines, of which the following is a description, reference being had to the accompanying drawings, which are a part of this specification.

The invention relates to dental casting machines and has for its object to improve upon machines of this character, and consists in the several novel parts and combination of parts hereinafter described and shown in the accompanying drawings, in which:

Figure 1 is a plan view of the machine embodying the invention, parts being broken away and parts being shown in section; Fig. 2 is a side view of the machine, parts being shown in section; Fig. 3 is an end view of the mold section; Fig. 4 is an end view of the crucible, parts being shown in section.

In the drawings the numeral 5 designates the supporting frame of the machine having a base 6 and casing 7 provided with a removable end plate 8 and vertically disposed ball bearing journals 9 and 10 in which the upright shaft 11 is revolubly mounted, the end of the casing being provided with a cap 12 engaging the journal 9.

The shaft 11 is adapted to be continuously rotated by means of a cranked shaft 13 having a geared connection with the shaft 11 and journaled in roller bearings 14 in a housing 15 on the casing 7. The geared connection comprises a bevel gear 16 on the shaft 13 meshing with a bevel gear 17 on the shaft 11.

A slot 18 is provided in the upper end of the shaft 11 and one end of the said slot is beveled to form a knife edge support 19 for receiving a crucible and mold supporting lever 20 which is provided with a V-notch 21 on which the support 19 is mounted.

Mounted upon one end of the lever 20 and movable with respect thereto is a crucible holder 21 having rollers 22 engaging the top and bottom sides of the lever and a crucible 23 is mounted on said holder. With this construction the crucible may be moved back and forth upon the lever 20 and this is important as the crucible may be moved away from the mold section and toward the center of the rod to heat the gold so that the heat from the torch will not damage the mold as is the case with prior machines.

The crucible 23 is of novel form in that in addition to the cup 24 and spout 25 its back end 26 slopes upwardly toward a higher side 27 so as to prevent the melted gold from splashing out of the crucible.

The mold section consists of an end bracket 28 secured to the lever 20, an end bracket 29 slidably mounted on the lever 20, a removable shell 30 clamped between said brackets by means of a clamping screw 31 carried by a bracket 32 mounted on the lever 20 and rotatably connected at its front end 33 with the bracket 29. The rear side of the bracket 28 is provided with shoulders 34 for receiving the ends of a series of mold shells similar to the shell 30 and of different shapes and sizes, any one of said shells being clamped between said brackets by moving the bracket 29 up against the rear end of the shell disposed between the brackets by means of the screw 31. The bracket 28 has a central opening 35 for the purpose of providing access to the mold 36 which is formed as usual of investment material having a sprue hole 37 leading to the mold cavity 38 with a conical end 39 to direct the melted gold into the hole 37 and cavity 38.

Contrary to the usual practice, the portion 40 of the lever 20 upon which the mold is mounted is bent or formed to extend at an angle to the portion of this end of the lever 20 which carries the crucible holder. This angle is such that on the revolution of the shaft 20 in the direction indicated by the arrow the gold discharged by centrifugal force in a tangential direction from the spout 25 will be projected through the openings 35, 95 end 39 and hole 37 into the cavity 38 and be impacted into said cavity to form the casting.

The rod or lever 20 is a balancing lever, and the mold and crucible at one end are balanced by a weight 41 slidably mounted on the other end of the rod and adjustably secured thereto by a latch 42 releasably engaging any one of a set of locking recesses 43 in the rod and held locked by a spring 44 and adapted to be released by a push button 45 secured to the latch. When the mold and crucible are balanced by the weight the rod is locked in position by means of a cap nut 46 mounted on the threaded end 47 of the shaft 11 and adapted to be screwed down to engage the lever 20.

In the operation of the machine, the mold is clamped into position on the lever 20 and the crucible charged with the desired amount of gold and moved to discharging position adjacent the mold and the parts are then balanced by shifting the weight 41 at the other end of the lever to a balancing position. Then the lever 20 is locked to the shaft 11 by the cap 46 and the crucible moved away from the mold toward the shaft 11 and the gold melted. When the crucible with the melted gold is run out on the lever 20 to a position adjacent the mold and the crank shaft turned to rotate the lever 20 in a direction which advances the open end of the mold section first and by centrifugal action the gold is projected from the crucible into the mold cavity.

What we claim as our invention is:

1. In a dental casting machine, the combination of a rotary drive shaft, a supporting member carried thereby and having one end extending at an angle and rearwardly of the direction of rotation, a mold secured to said rearwardly extending end of the supporting member, and a crucible, carried by said member adjacent said rearwardly extending end and mold and having a spout extending out of line with the mold.

2. A dental casting machine comprising a rotatable supporting member having its ends bent rearwardly with respect to its direction of rotation, a mold mounted on one bent end of the supporting member, a crucible adapted to discharge its contents into the mold, and a balance weight carried by the other bent end of said member.

3. In a dental casting machine, the combination of a rotary upright shaft provided with a knife edge, of a supporting member balanced on said knife edge, a mold and a crucible carried on one of said members, a balancing weight adjustably secured to the other end of said member, and means for securing the member to the upright shaft when balanced.

4. In a dental casting machine, a mold and a crucible provided with a spout, and means for rotating said mold and crucible to project the material melted in the crucible into the mold by the action of centrifugal force, the mold being out of line with the crucible spout and disposed in the direction taken by the melted material when expelled from the crucible by centrifugal force.

5. In a dental casting machine, the combination, with a rotary shaft and a supporting member carried thereby, of a molding flask comprising a front bracket secured to said member and having an opening therein, a second bracket slidably mounted on said shaft at the rear of said front bracket, a mold shell interposed between said front and second brackets, and means for moving the rear bracket into clamping engagement with the shell including a third bracket rearwardly of said second bracket, and a clamping screw carried by said third bracket and adapted to engage the rear of said mold shell.

6. In a dental casting machine, the combination with a rotary drive shaft, of a supporting member carried by said shaft and having its ends bent rearwardly relative to its direction of rotation, a mold mounted on one bent end of the member, a crucible mounted on said member adjacent the bent end carrying said mold and capable of movement toward and away from said mold, and an adjustable balance weight carried by the other bent end of said member.

7. A dental casting machine comprising a rotatable supporting member having one end bent rearwardly at an angle to its direction of rotation, a mold carried by the bent end of the supporting member, and a crucible carried by the supporting member and arranged to discharge its contents into the mold.

In testimony whereof, we affix our signatures.

MORTON H. MORTONSON.
JAMES C. MORTONSON.